No. 614,707. Patented Nov. 22, 1898.
A. E. DOBBS.
METER FOR WATER, &c.
(Application filed Sept. 7, 1897.)
(No Model.) 4 Sheets—Sheet I.
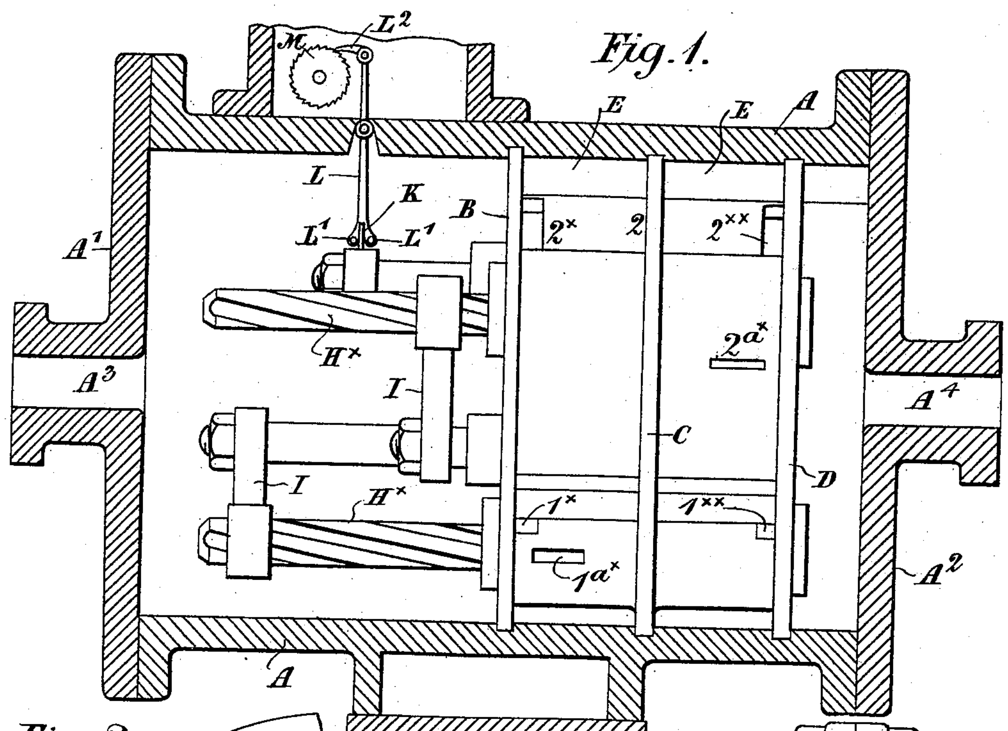
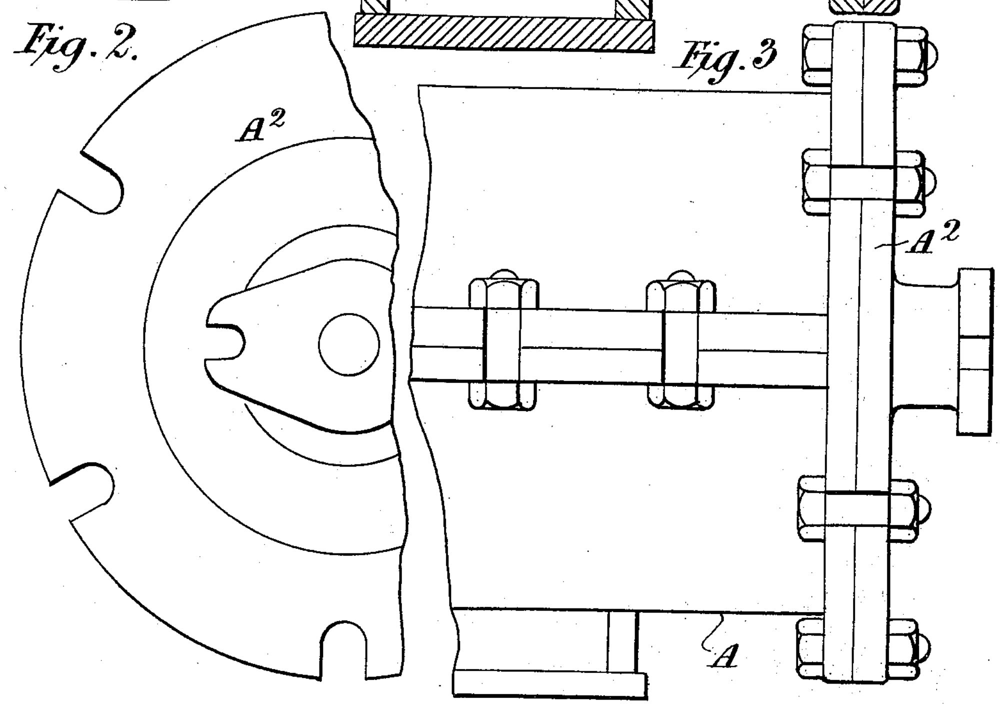
Witnesses.
E. A. Balloch
Walter R. Tabbs
Inventor.
A. E. Dobbs
By his Attorneys
Baldwin Davidson & Wight
THE NORRIS PETERS CO., PHOTO-LITHO., WASHINGTON, D. C.

No. 614,707.

Patented Nov. 22, 1898.

A. E. DOBBS.

METER FOR WATER, &c.

(Application filed Sept. 7, 1897.)

(No Model.)

4 Sheets—Sheet 2.

Witnesses

B. W. Miller,

Guy E. Davis

Inventor

Archibald E. Dobbs,

By his Attorneys

Baldwin, Davidson & Wight.

THE NORRIS PETERS CO., PHOTO-LITHO., WASHINGTON, D. C.

No. 614,707. Patented Nov. 22, 1898.
A. E. DOBBS.
METER FOR WATER, &c.
(Application filed Sept. 7, 1897.)
(No Model.) 4 Sheets—Sheet 3.
Fig. 6.
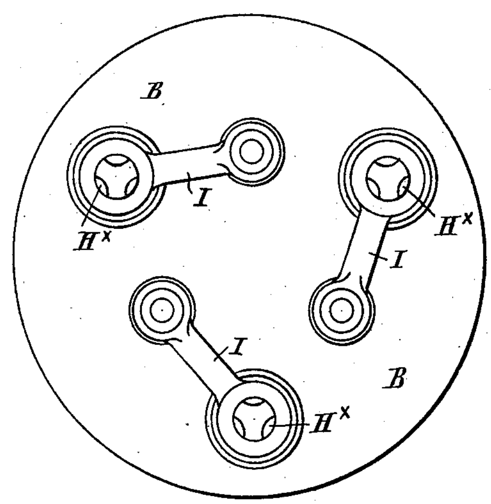
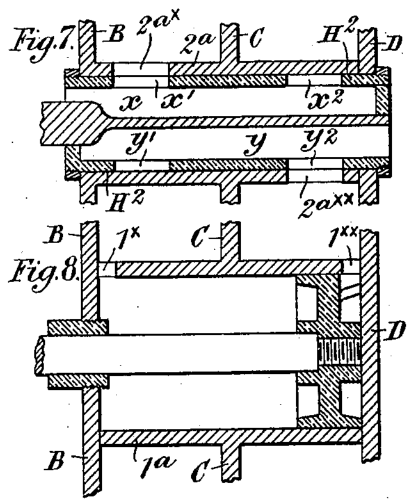
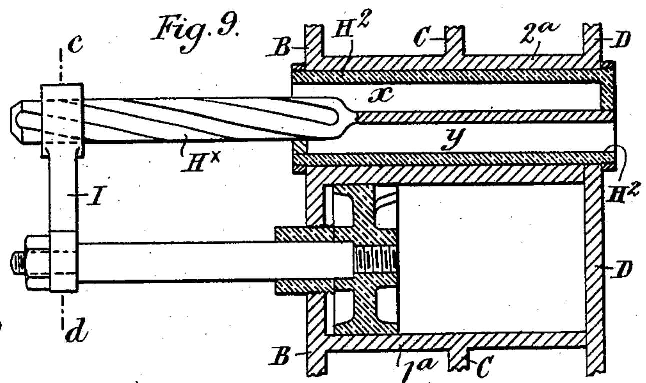
Fig. 10.
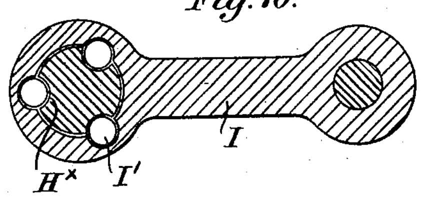
Witnesses
B. W. Miller
Guy E. Davis.
Inventor
Archibald E. Dobbs.
By his Attorneys
Baldwin Davidson & Wight
THE NORRIS PETERS CO., PHOTO-LITHO., WASHINGTON, D. C.

No. 614,707. Patented Nov. 22, 1898.

A. E. DOBBS.

METER FOR WATER, &c.

(Application filed Sept. 7, 1897.)

(No Model.) 4 Sheets—Sheet 4.

Witnesses
B. W. Miller
Guy E. Davis

Inventor
Archibald E. Dobbs,
By his Attorneys,
Baldwin Davidson & Wight

THE NORRIS PETERS CO., PHOTO-LITHO., WASHINGTON, D. C.

UNITED STATES PATENT OFFICE.

ARCHIBALD E. DOBBS, OF LONDON, ENGLAND.

METER FOR WATER, &c.

SPECIFICATION forming part of Letters Patent No. 614,707, dated November 22, 1898.

Application filed September 7, 1897. Serial No. 650,792. (No model.)

*To all whom it may concern:*

Be it known that I, ARCHIBALD EDWARD DOBBS, master of arts and barrister at law, a subject of the Queen of Great Britain, residing at 9 Old Square, Lincoln's Inn, and 35 Wetherby Mansions, Earl's Court Square, London, in the county of Middlesex, England, have invented certain new and useful Improvements in Meters for Water and other Fluids, of which the following is a specification.

According to this invention I construct a fluid-meter of three or other larger number, preferably an odd number, of cylinders, each fitted with a piston and each end of each cylinder capable of being put alternately into connection with the supply and with the delivery through suitable valves in such a way that when one end of a cylinder is open to the supply its other end is open to the delivery. The movement of the piston of one cylinder I make to shift the position of the valves of the next cylinder, and so on continuously.

Figure 4:
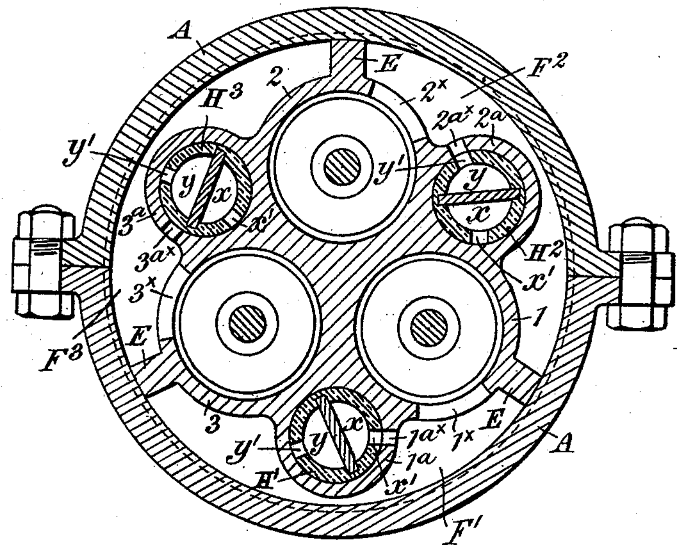
Figure 5:
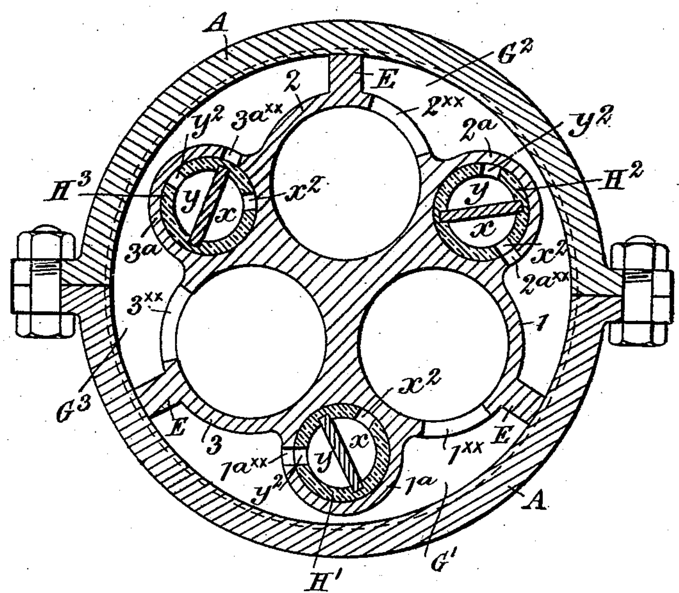
Figure 11:
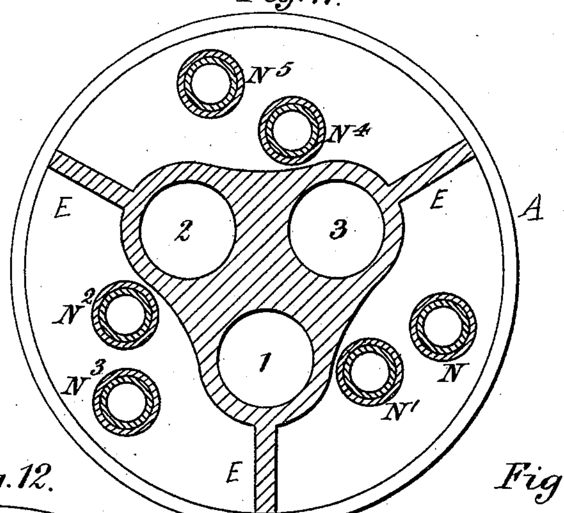
Figure 12:
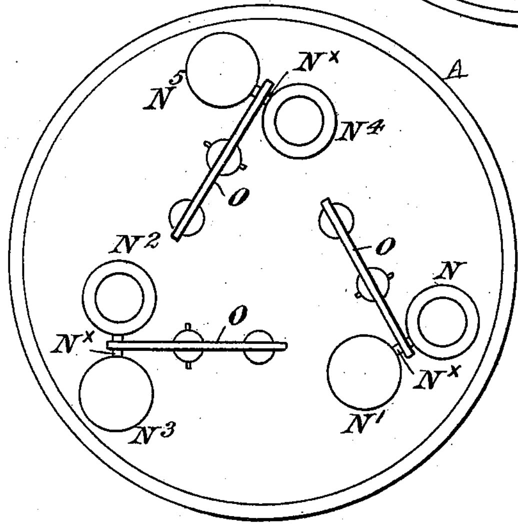
Figure 13:
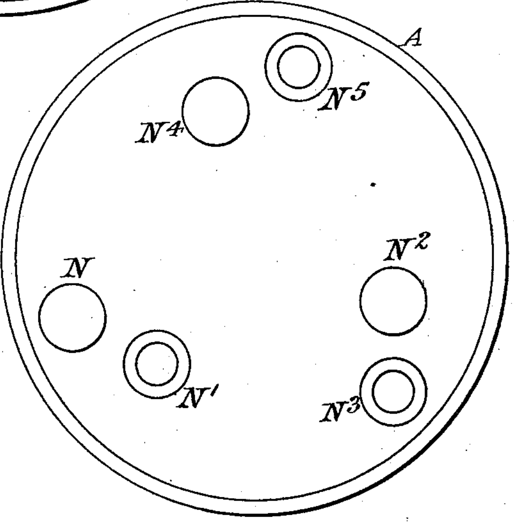
Figure 14:
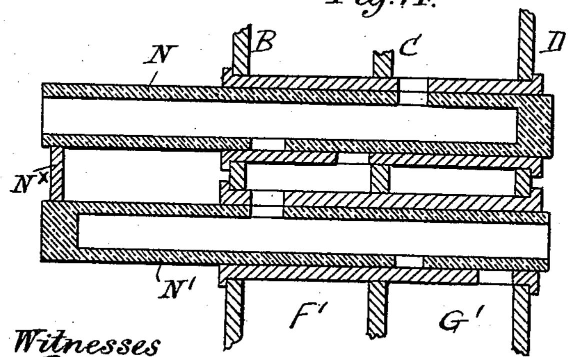
Figure 15:
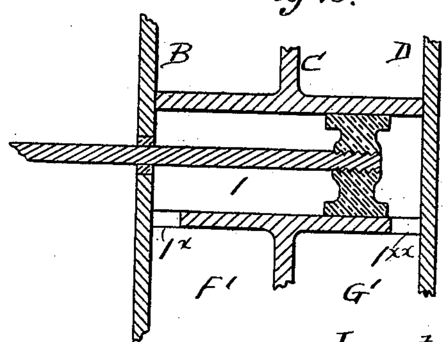

Figure 1 of the drawings annexed is an elevation, with the outer casing in section, of a meter constructed in the above manner. Fig. 2 is part of an end elevation, and Fig. 3 part of a side elevation, of the casing. Fig. 4 is a cross-section taken through the cylinder and valve-ports at that end of the cylinders which is toward the inlet end of the casing. Fig. 5 is a similar section through the ports at the opposite end of the cylinders. Fig. 6 is a left-hand end view with the casing removed. Fig. 7 is a longitudinal section of one of the valves, and Fig. 8 a longitudinal section of one of the cylinders. Fig. 9 is a longitudinal section of one of the cylinders and the valve of the next cylinder, showing the way in which the piston-rod actuates the valve. Fig. 10 is a cross-section through the line *c d*, Fig. 9. Figs. 11 to 15 show a modified form of the meter in which endwise-moving valves are used in place of valves which have a partial rotation given to them. Fig. 11 is a cross-section through the cylinders. Figs. 12 and 13 show the end division-plates of the casing. Fig. 14 is a longitudinal section through a pair of the valves, and Fig. 15 a longitudinal section through one of the cylinders.

In Figs. 1 to 10 A is the outer casing of the meter, closed at its ends by end covers $A'$ $A^2$. The end cover $A'$ is formed with an inlet-passage $A^3$ and the cover $A^2$ with an outlet-passage $A^4$.

1, 2, and 3 are three cylinders, and $1^a$ $2^a$ $3^a$ are three cylindrical valve-shells. These are all cast together in one piece, together with two disks B C. One end of each cylinder is closed by the disk B. The other end is closed by a third disk D. The edges of the disk fit into grooves formed around the interior of the casing, as shown in Fig. 1. The casing is divided longitudinally into two parts, as shown at Fig. 3, to allow of the edges of the disks being so inserted into the grooves.

E E E are three radial projections standing outward, one from each cylinder, and fitting against the interior of the casing. These divide the space between the disks B and C and the space between the disks C and D each into three compartments. The cylinder 1 opens through a port $1^{\times}$ into one of these compartments $F'$ at its end which is toward the inlet end of the casing, the cylinder 2 similarly opens through a port $2^{\times}$ into a compartment $F^2$, and the cylinder 3 through a port $3^{\times}$ into a compartment $F^3$. At the opposite end the cylinder 1 opens through a port $1^{\times\times}$ into a compartment marked $G'$, the cylinder 2 opens through a port $2^{\times\times}$ into a compartment $G^2$, and the cylinder 3 through a port $3^{\times\times}$ into a compartment $G^3$. The valve-shell $1^a$, which passes through the compartments $F'$ $G'$, has also a port $1^{a\times}$ formed through it opening into the compartment $F'$ and a similar port $1^{a\times\times}$ opening into the compartment $G'$. Similarly the valve-shells $2^a$ and $3^a$ have ports $2^{a\times}$ $2^{a\times\times}$ and $3^{a\times}$ $3^{a\times\times}$ opening into the compartments $F^2$ $F^3$ and $G^2$ $G^3$. Into each valve-shell fits one of the hollow cylindrical plugs $H'$, $H^2$, and $H^3$. Each plug is divided longitudinally by a partition into two channels. One of these (marked $x$) is open at its end which is toward the inlet end of the casing, so that water can always pass freely into it from this end of the casing. The opposite end of this channel is closed. The other channel $y$ is closed at the inlet end and open at the outlet end. Each end of each plug has two ports formed in it, one, $x'$, at the inlet end opening from the channel $x$, the other, $y'$, opening from the channel $y$. At the outlet end there are similar ports $x^2$ $y^2$.

By giving somewhat less than a half-turn to the valve-plug H′ either one or other of its ports $x'$ $y'$ can be brought opposite to the port $1^{a\times}$ and the ports $x^2$ $y^2$ opposite to the port $1^{a\times\times}$ and so that when $x'$ is opposite to $1^{a\times}$ $y^2$ is opposite to $1^{a\times\times}$ and when $y'$ is opposite to $1^{a\times}$ $x^2$ is opposite to $1^{a\times\times}$. Similarly the valve-plugs $H^2$ $H^3$ when they have nearly a half-turn given to them have their ports brought opposite to the ports $2^{a\times}$ $3^{a\times}$ $2^{a\times\times}$ $3^{a\times\times}$.

Each valve-plug H′ $H^2$ $H^3$ has a cylindrical stem extending from it, in which are spiral grooves $H^\times$. Each stem is embraced by a collar at the end of an arm I, which extends from the end of one of the piston-rods. Spherical balls I′, which lodge in corresponding hemispherical recesses on the inside of the collar, project from these recesses into the grooves $H^\times$, or pins might be used in place of balls. In this way when the piston of any cylinder is moved from one end of the cylinder to the other the valve which is operated by the piston-rod of that piston has nearly half a turn given to it. The piston-rod of cylinder 1 gives motion in this way to valve $H^2$, the piston-rod of cylinder 2 gives motion to valve $H^3$, and the piston-rod of cylinder 3 to valve H′.

In the position of the parts as shown at Figs. 1, 4, and 5 the piston of the cylinder 1 has completed its stroke toward the outlet end, the piston of the cylinder 2 is moving toward the inlet end and is shifting the valve $H^3$ into position to cause the piston of cylinder 3 to move from the inlet end toward the outlet end, and so on continuously. As seen in Fig. 4, the valve H′ is at this time in such a position that its inlet-channel $x$ opens through its port $x'$ into the compartment F′ and is in communication through this compartment with the port $1^\times$ at the end of the cylinder 1, which is next the inlet end of the casing, while at the same time, as seen in Fig. 5, the outlet-channel $y$ of the same valve is open to the opposite end of the cylinder 1. The same figures also show that the inlet-channel $x$ of valve $H^2$ is open to that end of cylinder 2 which is toward the outlet end of the casing and the outlet-channel $y$ is open to the opposite end of the cylinder. The piston of this cylinder is therefore traveling toward the inlet end of the casing. The valve $H^3$ is in an intermediate position, passing from one of its extreme positions to the other to come into position to cause the piston of cylinder 3 to travel away from the end of the cylinder which is toward the inlet end of the casing, and when the piston of cylinder 3 travels in this direction it shifts valve H′. Thus when the piston of cylinder 1 has moved to the right-hand end of the cylinder the piston of the cylinder 2 moves toward the left-hand end of that cylinder, and afterward the piston of the cylinder 3 moves toward the right-hand end, and next the piston of cylinder 1 travels to the left-hand end, and so on continuously.

The to-and-fro movement of the piston-rod of one or other of the cylinders is arranged to give motion to recording mechanism to record the number of movements made by it. In Fig. 1 the piston-rod of cylinder 2 is shown to have a pin K extending from it to come alternately against pins L′ L′ on a lever L and give to this lever a rocking movement, and the lever, by a pawl $L^2$, which it carries, gives a step-by-step rotating movement to a ratchet-wheel M on the axis of the first wheel of a train of recording-wheels.

In place of using only three cylinders a greater odd number might be used and be arranged to act in precisely the same way.

In the modification shown at Figs. 11 to 15 three pairs of endwise-moving valves are used instead of the three rotating valves H′ $H^2$ $H^3$. The cylinders 1 2 3 and the outer casing, with its transverse partitions B C D, are constructed in the same way as in the figures before described. N N′ $N^2$ $N^3$ $N^4$ $N^5$ are the three pairs of valves. One valve of each pair is closed at the end which is toward the inlet. The other is closed at the end which is toward the outlet. The two valves in each pair are connected together at $N^\times$ and receive an endwise to-and-fro movement from one arm of a lever O, the other arm of which is moved to and fro by the piston-rod of one or other of the cylinders. The action of the valves is just the same as the action of the rotary valves. When the inlet-valve of one pair—say N—is open through one of its ports with one end of a cylinder 1, the outlet-valve N of the same pair is open to the other end of the cylinder, and the piston-rod of cylinder 1 gives motion to the valves of cylinder 2 and the piston-rod of cylinder 2 to the valves of 3, and so on. Other forms of valves might be used.

What I claim is—

1. The combination of cylinders 1, 2, 3 compartments F′ $F^2$ $F^3$ and G′ $G^2$ $G^3$ with which the opposite ends of the cylinders communicate partially-rotating valves H′ $H^2$ $H^3$ by which when one compartment F′ $F^2$ $F^3$ is put into communication with the inlet its corresponding compartment G′ $G^2$ $G^3$ is put into communication with the outlet and mechanism to which the rotating valve $H^2$ of cylinder 2 is operated by the piston of cylinder 1 and the valve $H^3$ of the cylinder 3 by the piston of cylinder 2 and the valve H′ of cylinder 1 by the piston of the cylinder 3.

2. The combination of the outer casing having an inlet at one end and an outlet at the other, three partitions extending across the casing, the space between the central partition and one end partition divided into as many compartments as there are cylinders and between the central partition and the other end partition into a corresponding number of compartments, a cylinder and valve or valves extending through each pair of compartments, mechanism by which the piston-rod of any one cylinder gives motion to the valve or valves belonging to the next cylinder and mechanism for recording the movement of the pistons.

3. The combination of the outer casing having an inlet at one end an outlet at the other, three partitions extending across the casing, the space between the central partition and one end partition divided into as many compartments as there are cylinders and between the central partition and the other end partition into a corresponding number of compartments, a cylinder and cylindrical valve-shell and valve extending through each pair of compartments a screw or spirally-grooved stem extending from one end of each valve, a collar surrounding and engaging with each stem and an arm connecting the piston-rod of one cylinder with the collar which engages with the stem of the valve of the next cylinder and mechanism for recording the movement of the pistons.

4. The combination of the outer casing having an inlet at one end an outlet at the other, three partitions extending across the casing, the space between the central partition and one end partition divided into as many compartments as there are cylinders and between the central partition and the other end partition into a corresponding number of compartments a cylinder and cylindrical valve-shell extending through each pair of compartments, a cylindrical valve fitting within each valve-shell a longitudinal partition dividing each cylindrical valve into two channels one closed at the inlet the other at the outlet end, a port leading out from each channel near each end of the valve and ports near the ends of the valve-shell in such a position that when a port at one end of the valve and leading from its inlet-channel is opposite to the port near one end of the valve-shell a port opening into the outlet-channel of the valve is opposite to the other port in the opposite end of the valve-shell.

ARCHIBALD E. DOBBS.

Witnesses:
FREDERICK CARPMAIL,
W. M. HARRIS.